(No Model.)
G. A. BETANCOURT.
POTATO PARER.
No. 298,547. Patented May 13, 1884.
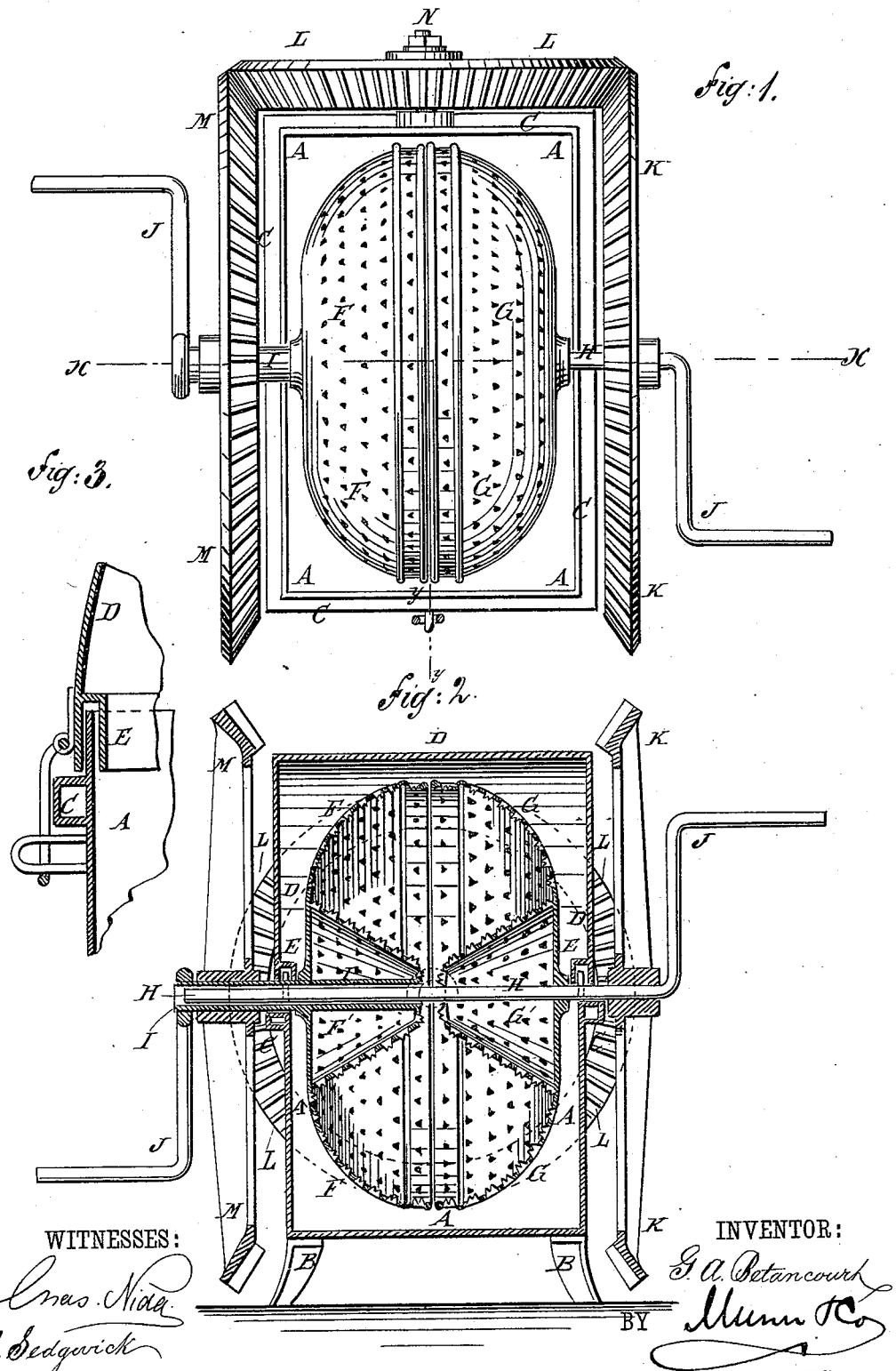
WITNESSES:
Chas. Nida
C. Sedgwick
INVENTOR:
G. A. Betancourt
BY Munn & Co
ATTORNEYS.

though the upper end of the vessel A is placed the potato or potatoes to be pared. The cups F G are then brought together and are placed in the vessel A, the shaft H being placed in its bearing. The cover D is then placed in position, and one of the cranks J is turned, so as to revolve the cups F G in opposite directions. The potato or potatoes will thus be rolled around within the cups F G, and their skins will be removed in a rapid and thorough manner by the combined action of the inwardly-projecting burrs of the said cups F G and the outwardly-projecting burrs of the perforated projections F' G'.

UNITED STATES PATENT OFFICE.

GASPAR A. BETANCOURT, OF NEW YORK, N. Y.

POTATO-PARER.

SPECIFICATION forming part of Letters Patent No. 298,547, dated May 13, 1884.

Application filed September 8, 1883. (No model.)

*To all whom it may concern:*

Be it known that I, GASPAR A. BETANCOURT, of the city, county, and State of New York, have invented a new and useful Improvement in Potato-Parers, of which the following is a full, clear, and exact description.

Reference is to be had to the accompanying drawings, forming a part of this specification, in which similar letters of reference indicate corresponding parts in all the figures.

Figure 1 is a plan view of my improvement, the cover being removed. Fig. 2 is a sectional front elevation of the same, taken through the line *x x*, Fig. 1. Fig. 3 is a sectional side elevation of a part of the same, taken through the line *y y*, Fig. 1.

The object of this invention is to facilitate the paring of potatoes.

The invention consists in a potato-parer constructed with a vessel having a close cover, and a pair of oblate semispherical cups having inwardly-projecting burrs, and provided with interior conical projections having outwardly-projecting burrs, the said cups being placed mouth to mouth and attached to a shaft and sleeve provided with connecting gear-wheels and a driving crank or pulley. The cover rests upon a flange attached to the vessel, and is provided with a flange overlapping the inner side of the top of the said vessel, whereby the said cover is supported and the escape of water is prevented, as will be hereinafter fully described.

A represents the vessel, which is provided with feet or short legs B, to support it at a suitable height above the floor or other support.

Around the vessel A, at a little distance from its edge, is formed, or to it is attached, a shoulder or flange, C, to serve as a seat for the cover D, the lower edge of which overlaps the upper part of the outer side of the said vessel A.

To the inner side of the cover D, at a little distance from its edge, is attached a flange, E, which overlaps the upper part of the inner side of the vessel A, as shown in Figs. 2 and 3, to prevent water from splattering out of the machine while the said machine is being used.

Within the vessel A are placed edge to edge two oblate semispheroidal cups, F G, which are punctured from their outer sides, to form inwardly-projecting burrs to act upon the potatoes and remove their skins. The cups F G are strengthened around their edges by beads, as shown in Figs. 1 and 2. The cup G is attached at its center to a shaft, H, the outer part of which revolves in a recess in the edge of the vessel A. The inner part of the shaft H revolves in a sleeve, I, to which the center of the cup F is attached, and which revolves in a recess in the upper edge of the vessel A.

To the outer ends of the shaft H and sleeve I are attached, or upon them are formed, cranks J, so that the operator can turn the cups F G in opposite directions at the same time by taking hold of the cranks J.

To the shaft H is attached a large beveled-gear wheel, K, the teeth of which mesh into the teeth of a large beveled-gear wheel, L, pivoted to a gudgeon, N, attached to the end of the vessel A or to some other suitable support. The teeth of the beveled-gear wheel L mesh into the teeth of the beveled-gear wheel M, attached to the sleeve I, so that the two cups F G can be revolved in opposite directions by turning one of the cranks J. If desired, a pulley can be attached to the shaft H or sleeve I to receive a driving-belt, so that the machine can be driven from a steam-engine or other convenient power.

To the cups F G, around their centers, are soldered or otherwise secured the bases of two conical projections, F' G', which are perforated from their inner sides, to form outwardly-projecting burrs, in the same manner as the shell of the said cups. The inner end of the projection G' is perforated for the passage of the shaft H, and is secured to the said shaft. The inner end of the projection F' is perforated for the passage of the sleeve I, and is secured to the inner end of the said sleeve. With this construction the projections F' G' greatly increase the strength and firmness of the connection between the cups F G and their supports, and better adapt the said cups to sustain the weight of the potatoes being operated upon, and at the same time the said projections greatly increase the operating-surface of the said cups.

In using the machine the cups F G are raised from the vessel A and are drawn apart, and a suitable quantity of potatoes is placed within the said cups, which are then pushed together and returned to the vessel A. The vessel A is then nearly filled with water, the cover D is put on, and the cups F G are revolved in opposite directions by power applied to the shaft H and sleeve I, in the manner hereinbefore described. The revolution of the cups F G brings all parts of the potatoes into contact with the burrs of the said cups, so that all the skin will be quickly removed from the said potatoes. The cover D is then taken off, the cups F G are removed from the vessel A and drawn apart, and the pared potatoes are poured out, when the machine is ready to receive another supply of potatoes.

Having thus described my invention, I claim as new and desire to secure by Letters Patent—

1. A potato-parer constructed substantially as herein shown and described, and consisting of a vessel having a close cover and a pair of oblate semispherical cups provided with inwardly-projecting burrs, which cups are placed mouth to mouth and attached to a shaft and sleeve provided with a driving mechanism, as set forth.

2. In a potato-parer, the combination, with the vessel A and cover D, of the oblate semispherical cups F G, the shaft and sleeve H I, the connecting gear-wheels K L M, and a driving crank or pulley, substantially as herein shown and described, whereby the said cups will be revolved in opposite directions, as set forth.

3. In a potato-parer, the combination, with the cups F G, having inwardly-projecting burrs, and the shaft and sleeve H I, of the interior conical projections, F' G', having projecting burrs, substantially as herein shown and described, whereby the said cups are more firmly supported and an increased operating-surface is obtained, as set forth.

GASPAR A. BETANCOURT.

Witnesses:
JAMES T. GRAHAM,
C. SEDGWICK.